(12) United States Patent
Yu

(10) Patent No.: US 7,661,638 B2
(45) Date of Patent: Feb. 16, 2010

(54) SUCTION CUP STRUCTURE

(75) Inventor: Lin-Chien Yu, Yonghe (TW)

(73) Assignee: Mitac International Corp., Taoyuan (TW)

( * ) Notice: Subject to any disclaimer, the term of this patent is extended or adjusted under 35 U.S.C. 154(b) by 431 days.

(21) Appl. No.: 11/756,189

(22) Filed: May 31, 2007

(65) Prior Publication Data

US 2007/0278369 A1 Dec. 6, 2007

(30) Foreign Application Priority Data

Jun. 1, 2006 (TW) .............................. 95119464 A

(51) Int. Cl.
*F16B 47/00* (2006.01)

(52) U.S. Cl. .............. 248/205.8; 248/205.5; 248/309.3; 248/363

(58) Field of Classification Search .............. 248/205.8, 248/205.5, 205.6, 205.7, 205.9, 206.1, 206.2, 248/206.3, 309.3, 363, 683
See application file for complete search history.

(56) References Cited

U.S. PATENT DOCUMENTS

| | | | | |
|---|---|---|---|---|
| 6,550,735 B1 * | 4/2003 | Zheng | .......................... | 248/304 |
| 6,749,160 B1 * | 6/2004 | Richter | .................... | 248/206.2 |
| 7,007,908 B2 * | 3/2006 | Tsay | ........................ | 248/309.3 |
| 7,021,593 B1 * | 4/2006 | Fan | .......................... | 248/206.2 |
| 7,066,434 B2 * | 6/2006 | Kwok | ....................... | 248/205.8 |
| 7,229,059 B1 * | 6/2007 | Hood | .......................... | 248/518 |
| 7,293,750 B2 * | 11/2007 | Richter | .................... | 248/205.5 |
| 7,431,250 B2 * | 10/2008 | Chen | ....................... | 248/205.5 |
| 7,441,734 B2 * | 10/2008 | Liou | ........................ | 248/205.5 |
| 7,516,926 B2 * | 4/2009 | Liu | .......................... | 248/205.5 |

* cited by examiner

*Primary Examiner*—J. Allen Shriver
*Assistant Examiner*—Todd M. Epps
(74) *Attorney, Agent, or Firm*—Wang Law Firm, Inc.; Li K. Wang

(57) ABSTRACT

A suction cup structure includes a suction cup, a lifting rod, a holder base, a slide bolt, a radial arm and an axial-bolt. The lifting rod is vertically connected to the suction cup, and has a through hole with horizontal penetration. The sleeve of the holder base has a rotation axis hole with horizontal penetration and a slide notch. The lifting rod is disposed in a sleeve of the holder base. The suction cup is under a disk body of the holder base. The slide bolt passes through a first hole of the button arm, the slide notch and the through hole. The axial-bolt also passes through the rotation axis hole and a second hole of the button arm. By pressing a button end of the button arm, an activation piece of the button arm rotates based on the axial-bolt to pull the slide bolt. The slide bolt then slides toward the upper portion from the lower portion of the first hole, and slides into the slide notch simultaneously to lift the lifting rod. The suction cup is therefore lifted to generate the suction.

11 Claims, 9 Drawing Sheets

SUCTION CUP STRUCTURE

FIELD OF THE INVENTION

The present invention generally relates to a suction cup structure, and more specifically relates to the suction cup structure that allows a suction cup to generate the suction by lifting a lifting rod.

BACKGROUND OF THE INVENTION

A fastening base, which is used to fasten an external electronic apparatus (e.g., mobile phones, personal digital assistants or navigation devices), is usually attached by a clip to an air outlet or a cigar-lighter of a vehicle. However, while using the fastening base, a user must lower his/her head to keep a close watch on the display. Messages shown on the display of the electronic apparatus may not be clearly seen by the user due to different types of vehicles. To overcome the aforesaid problem, the position of the fastening base needs to be redeployed. If the fastening base can be indirectly attached to a windshield of the vehicle through a connecting rod with a suction cup, the user does not need to lower his/her head to watch the display. Another option is therefore provided for the user to easily adjust the fastening base, such that the messages shown on the display of the electronic apparatus can be clearly seen.

To achieve the foregoing objective, the inventor of the present invention based on years of experience in the related field from conducting extensive research and experiments, invents a suction cup structure as a method or a basis for achieving the aforementioned objective.

SUMMARY OF THE INVENTION

Briefly, it is an object of the present invention to provide a suction cup structure that is taken as a selection for connecting or fastening. More specifically, a suction cup can generate the suction to increase convenience by using a button arm and a slide bolt to drive a lifting rod.

To achieve the foregoing objective, the suction cup structure of the invention comprises a holder base, a suction cup, a lifting rod, a spring, a slide bolt, a button arm and an axial bolt, wherein the holder base is composed of a sleeve vertically connected to a disk body, and the sleeve has a rotation axis hole and a slide notch, and the lifting rod has a through hole, and the button arm also has a first countersink aperture and a second countersink aperture. While assembling the holder base, the lifting rod, the spring and the button arm, the spring is put to the lifting rod, and the lifting rod is vertically assembled into the sleeve, and the button arm is vertically put to the sleeve. Therefore, the first countersink aperture corresponds to the slide notch and the through hole, and the second countersink aperture corresponds to the rotation axis hole. The lifting rod is vertically connected to a plate of the suction cup, and the suction cup is disposed under the disk body of the holder base. The disk body could provide a space for the suction cup to move therein. The slide bolt passes through the first countersink aperture, the slide notch and the through hole to assemble the button arm, the holder base and the lifting rod. The axial bolt passes through the second countersink aperture and the rotation axis hole in order to be a rotation axis pivot for the button arm, so that the button arm then rotates relative to the holder base. The button arm has a button end and a pair of activation pieces, wherein the pair of activation pieces are connected to two sides of the button end respectively The first countersink aperture and the second countersink aperture are disposed on the activation pieces.

Accordingly, the first hole has a longer axis and a shorter axis, the longer axis is directed at a second hole, and the first hole and the second hole are at different vertical lines. When the button end receives the outside pressures to generate torque toward the sleeve, the activation piece enables the slide bolt to slide from the lower portion of the first hole to the upper portion, and the slide bolt in the slide notch moves toward the upper portion from the lower portion to drive the lifting rod, thereby lifting the suction cup. The suction then is generated to achieve the goal of the invention. Moreover, the disk body of the holder base has a clasp which includes a protrusion and a downward button. When the lifting rod upwardly moves, the spring will generate a release force to prevent the lifting rod from moving toward the direction of the release force through the protrusion clasping the downward button so as to maintain the suction generated by the suction cup. Furthermore, when the suction is not in use, the downward button then is downwardly pressed. The protrusion is unable to clasp the button end to allow the lifting rod to move due to the release force. The suction generated by the suction cup then disappears and the button end is allowed to return to an original position.

To make it easier for our examiner to understand the object of the invention, its innovative features and performance, a detailed description and technical characteristics of the present invention are described together with the drawings as follows.

DETAILED DESCRIPTION OF THE PREFERRED EMBODIMENTS

Figure 1:
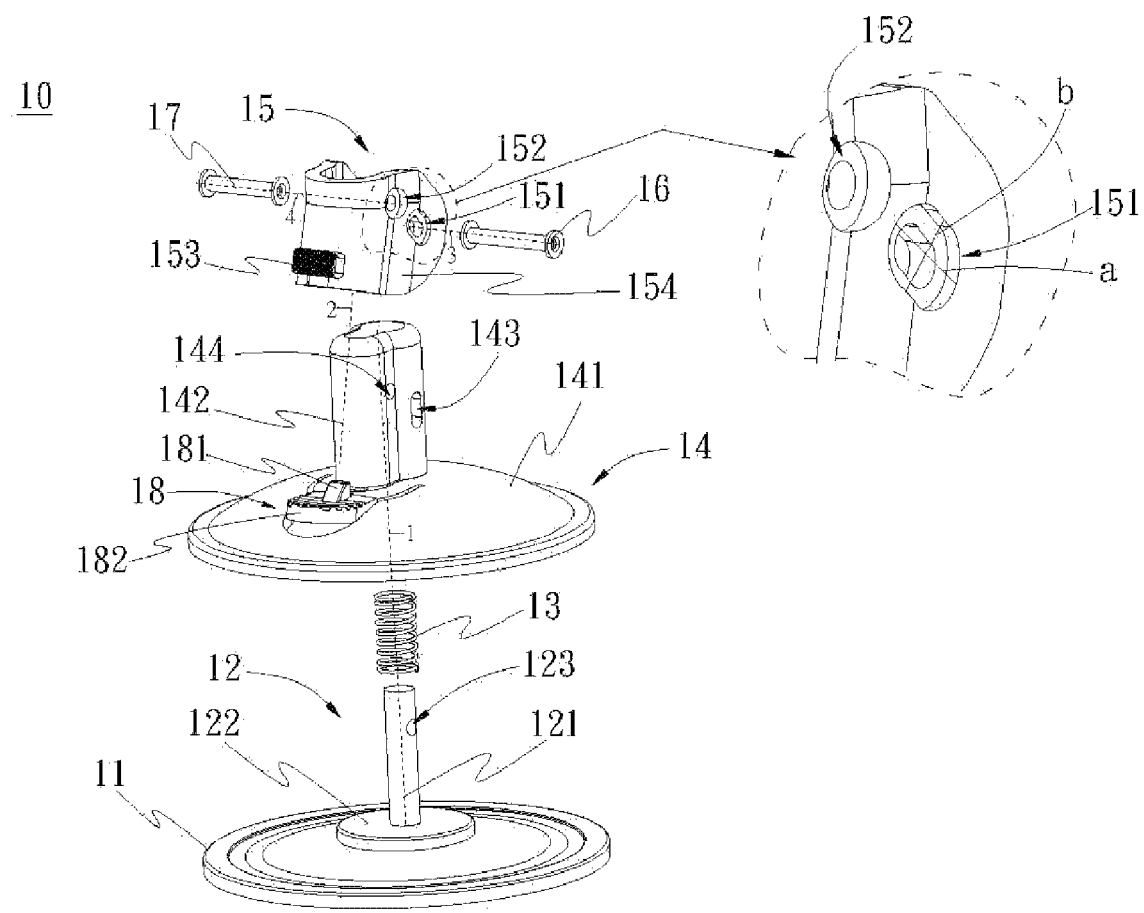
FIG. 1 is an exploded assembly drawing of a suction cup structure of the present invention.

Referring to the related figures for the suction cup structure according to a preferred embodiment of the present invention, wherein the same elements are described by the same reference numerals.

Figure 5:
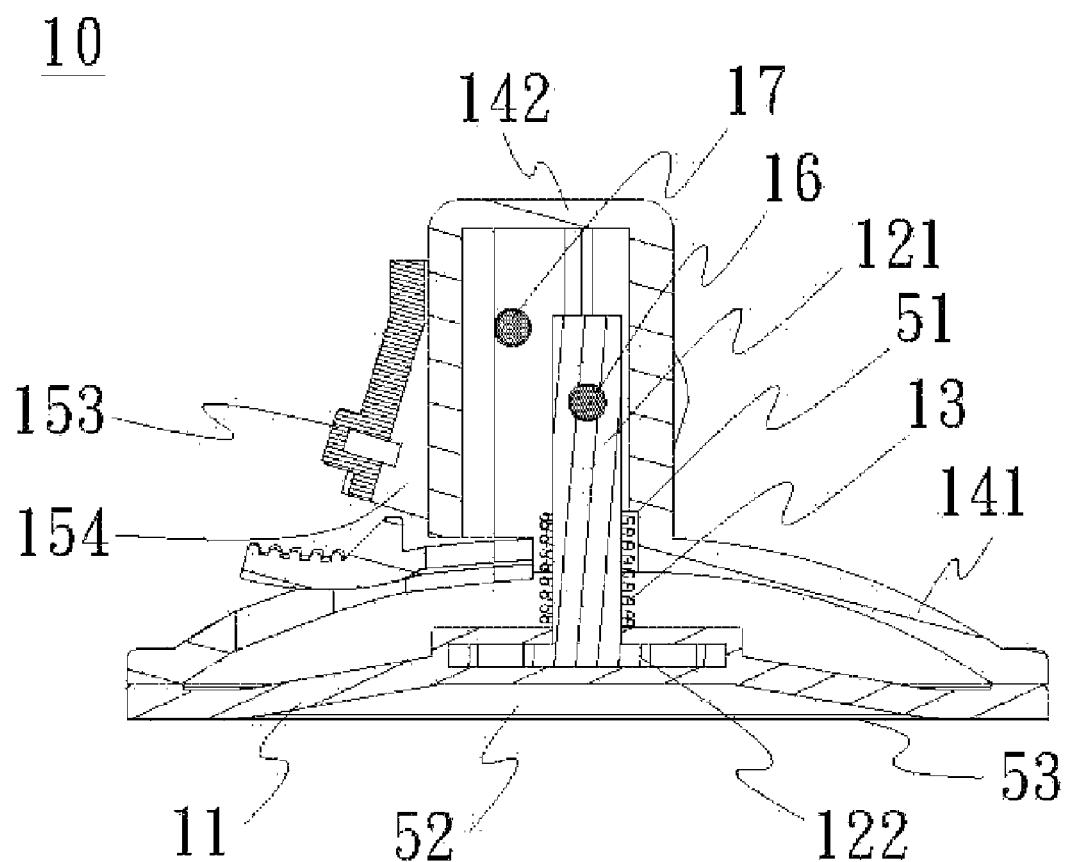
FIG. 5 is a cross-sectional drawing of a button arm of a suction cup structure being not pressed.
Figure 9:
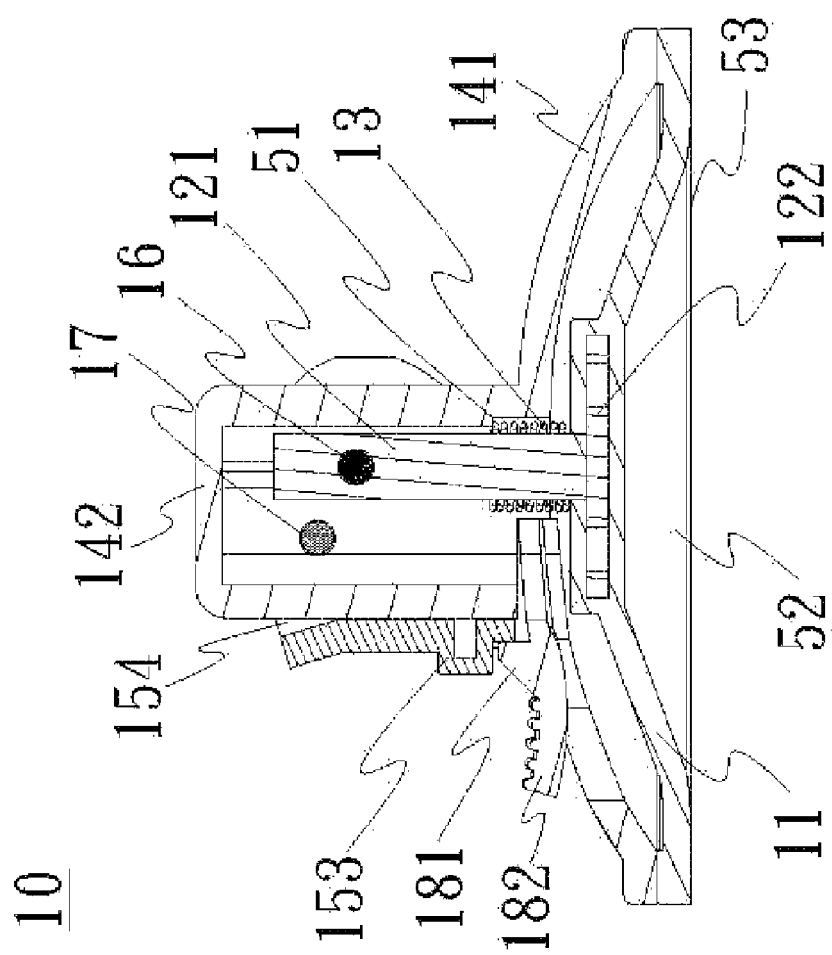
FIG. 9 is a cross-sectional drawing of a button arm of a suction cup structure being pressed.

Referring to FIG. 1 for the exploded assembly drawing of a suction cup structure of the invention, the suction cup structure 10 comprises a suction cup 11, a lifting rod 12, a spring 13, a holder base 14, a button arm 15, a slide bolt 16 and an axial bolt 17, wherein the suction cup 11 is a plate-shaped, and slightly has resilience. The lifting rod 12 has a rod 121 and a plate 122. An end of the rod 121 is vertically connected to a center of the plate 122, and the plate 122 is mounted to the suction cup 11 (as shown in FIG. 5 or FIG. 9). The rod 121 has a through hole 123 horizontally penetrating through the rod, and the size of the horizontal through hole meets the slide bolt 16. The spring 13 is sheathed to the rod 121, and the holder base 14 is composed of a sleeve 142 and a disk body 141 vertically connected to the sleeve. The sleeve 142 is connected to a protruding point of the disk body 141, and the edge of the disk body 141 closely meets the edge of the suction cup 11. A space is formed between an upward protrusion of the disk body 141 and the suction cup 11 to provide the suction cup 11 to upwardly move therein. According to the direction of assembly line 1, the lifting rod 12 is assembled into the sleeve 142, such that the hollow portion of the sleeve 142 accommodates the rod 121 of the lifting rod 12. Moreover, an axis of the sleeve 142 is taken as a symmetry point to horizontally and symmetrically dispose a pair of slide notches 143 on the sleeve 142. The vertical length of the slide notch is greater than the outer diameter of the slide bolt 16. A pair of rotation axis holes 144 which differ from the slide notches 143 horizontally penetrates through the surface of the sleeve 142. The size of the rotation axis holes 144 meets the axial bolt 17, and the position of the rotation axis holes 144 is not overlapped with the position of the rod 121. The button arm 15 has a button end 153 and a pair of activation pieces 154. The activation pieces 154 are connected to two sides of the button end 153 respectively The activation pieces 154 have a first countersink aperture 151 and a second countersink aperture 152, and the first countersink aperture 151 has a longer axis a and a shorter axis b. The longer axis a is directed at the second countersink aperture 152. The first countersink aperture 151 and the second countersink aperture 152 are at different vertical lines. According to the directions of the assembly line 1 and the assembly line 2, the holder base 14, the lifting rod 12 and the spring 13 are assembled. When the button arm 15 is sheathed to the sleeve 142 of the holder base 14, the first countersink aperture 151 corresponds to the slide notch 143 and the through hole 123, and the second countersink aperture 152 corresponds to the rotation axis hole 144. The slide bolt 16 passes through the first countersink aperture 151, the slide notch 143 in the button arm 15 and the through hole 123 to assemble the button arm 15, the holder base 14 and the lifting rod 12 according to the direction of the assembly line 3. According to the direction of the assembly line 4, the axial bolt 17 passes through the second countersink aperture 152 and the rotation axis hole 144 in the button arm 15 to pivotally connect the radial arm 15 and the holder base 14, thereby becoming the rotation axis pivot of the button arm 15. Accordingly, each element is assembled together to form the suction cup structure 10. The suction cup 11 is preferably made by rubbers as elastic materials. The slide notch 143 is preferably a rectangular notch.

Figure 2:
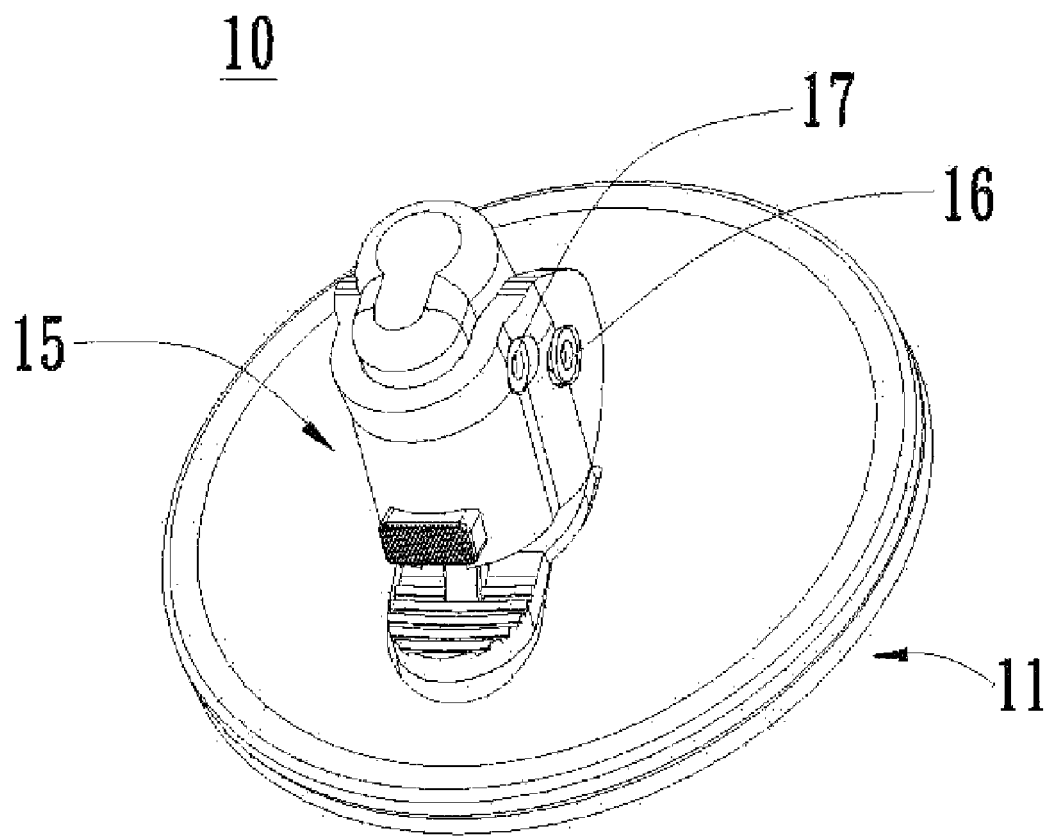
FIG. 2 is an assembly drawing of a button arm of a suction cup structure being not pressed.

Referring to FIG. 2 for the assembly drawing of a button arm of a suction cup structure is not pressed. In the suction cup structure 10, the slide bolt 16 is pivotally connected to the first countersink aperture 151 of the button arm 15, and passes through the slide notch 143 of the holder base 14 and the through hole 123 of the lifting rod 12. Moreover, the axial bolt 17 is also pivotally connected to the second countersink aperture 152 of the button arm 15, and passes through the rotation axis hole 144 of the holder base 14. After all elements are assembled together, the suction cup structure 10 then is formed. The button arm 15 of the suction cup structure 10 shown in the figure is not pressed yet. Therefore, the suction cup structure 10 does not generate the suction either.

Figure 3:
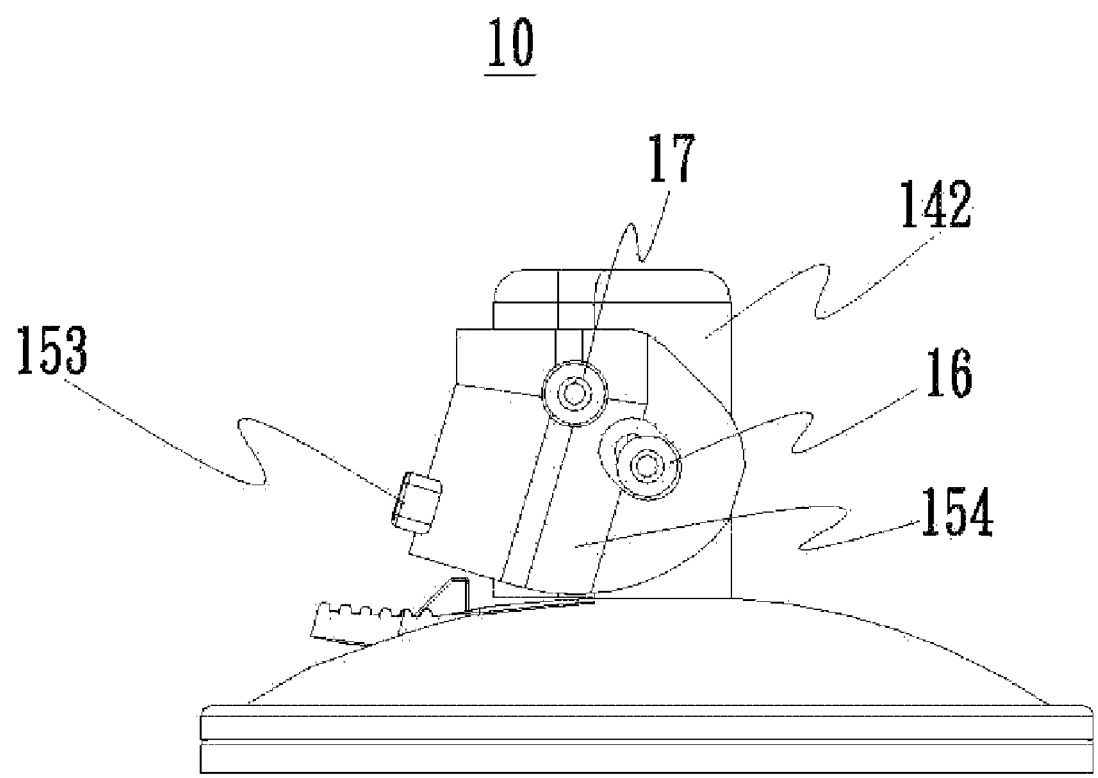
FIG. 3 is a side view of a button arm of a suction cup structure being not pressed.

Referring to FIG. 3 for the side view of a button arm of a suction cup structure is not pressed. The activation piece 154 of the button arm 15 of the suction cup structure 10 takes the axial bolt 17 as the rotation axis pivot, such that a shorter lever then is formed from the slide bolt 16 to the rotation axis pivot and a longer lever then is formed from the button end 153 to the rotation axis pivot. When the button end 153 of the button arm 15 is not inwardly pressed, the slide bolt 16 is at the lowest portion of the slide notch 143.

Figure 4:
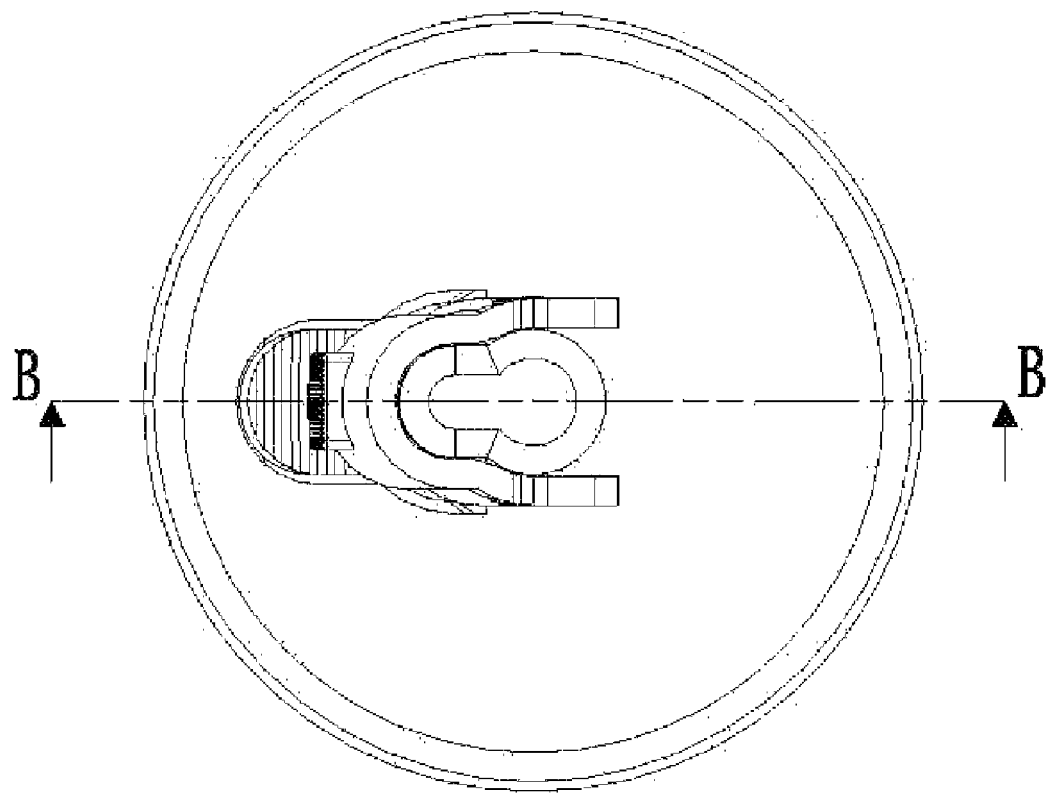
FIG. 4 is top view of a button arm of a suction cup structure being not pressed.

Referring to FIG. 4 and FIG. 5, FIG. 4 illustrates a top view of a button arm of a suction cup structure being not pressed and FIG. 5 illustrates a cross-sectional drawing of a button arm of a suction cup structure being not pressed. A line segment BB shown in FIG. 4 is taken as the section shown in FIG. 5 such that the button arm 15 of the suction cup structure 10 can be clearly seen when the button arm is not pressed yet. When the spring 13 is prevented by a concave groove 51 of the sleeve 142 and the button end 153 is not pressed, the release force provided by the spring 13 downwardly presses the plate 122 of the lifting rod 12 mounted to the suction cup 11, and the slide bolt 16 passing through the through hole 123 of the rod 121 is downwardly pulled to enable the slide bolt 16 to be stably fastened to the lowest portion of the slide notch 143 of the sleeve 142, so as to stabilize the button arm 15 without swaying. Meanwhile, the pressure of the space 52 between the adherence-area 53 and the suction cup 11 is equivalent to the outside, and the suction is therefore not generated yet.

Figure 6:
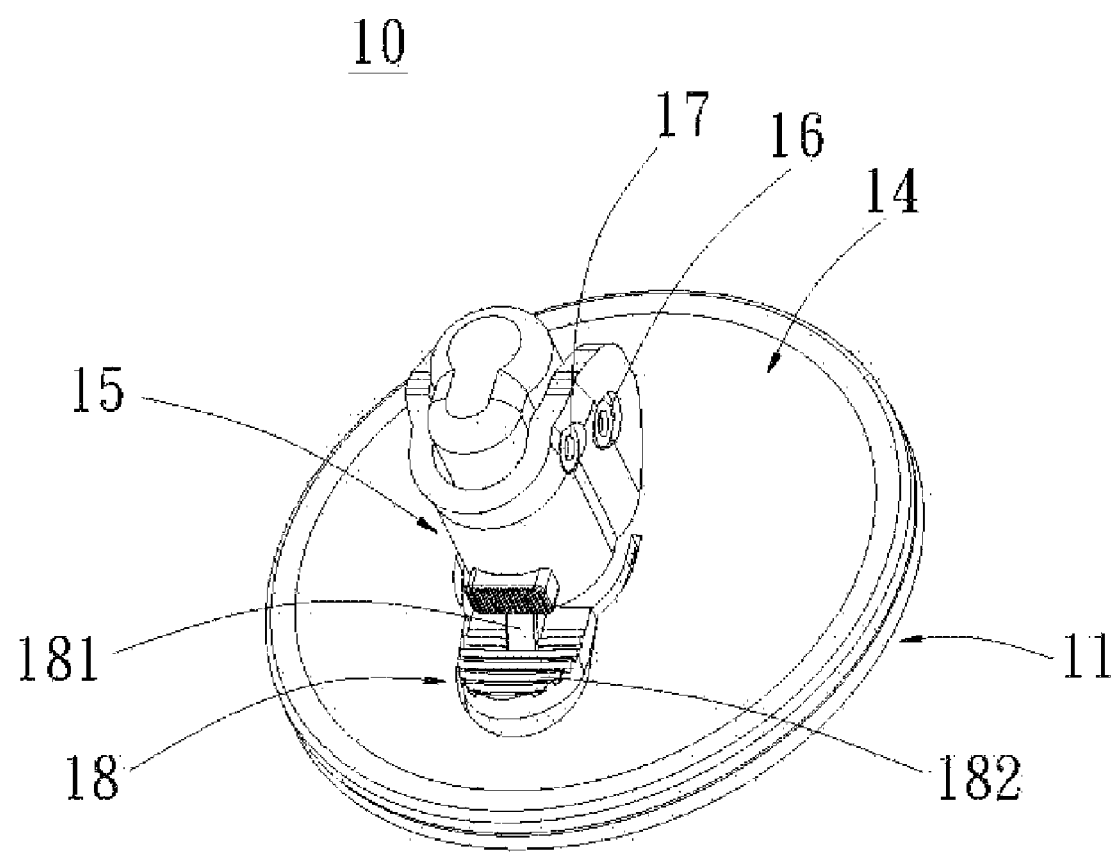
FIG. 6 is an assembly drawing of a button arm of a suction cup structure being pressed.

Referring to FIG. 6 for the assembly drawing of a radial arm of a suction cup structure is pressed. In the suction cup structure 10, the slide bolt 16 is pivotally connected to the first countersink aperture 151 of the button arm 15, and passes through the slide notch 143 of the holder base 14 and the through hole 123 of the lifting rod 12. Moreover, the axial bolt 17 is pivotally connected to the second countersink aperture 152 of the button arm 15, and passes through the rotation axis hole 144 of the holder base 14. Therefore, each element could be assembled together to form the suction cup structure 10. After the button end 153 of the button arm 15 of the suction cup structure 10 is pressed, the button arm 15 finishes the counterclockwise action relative to the holder base 14. The slide bolt 16 then slides to an upper portion from a lower portion of the first countersink aperture 151. Meanwhile, the slide bolt 16 upwardly slides in the slide notch 143 to drive the lifting rod 12, thereby lifting the suction cup 11. Accordingly, the suction cup structure 10 generates the suction.

Figure 7:
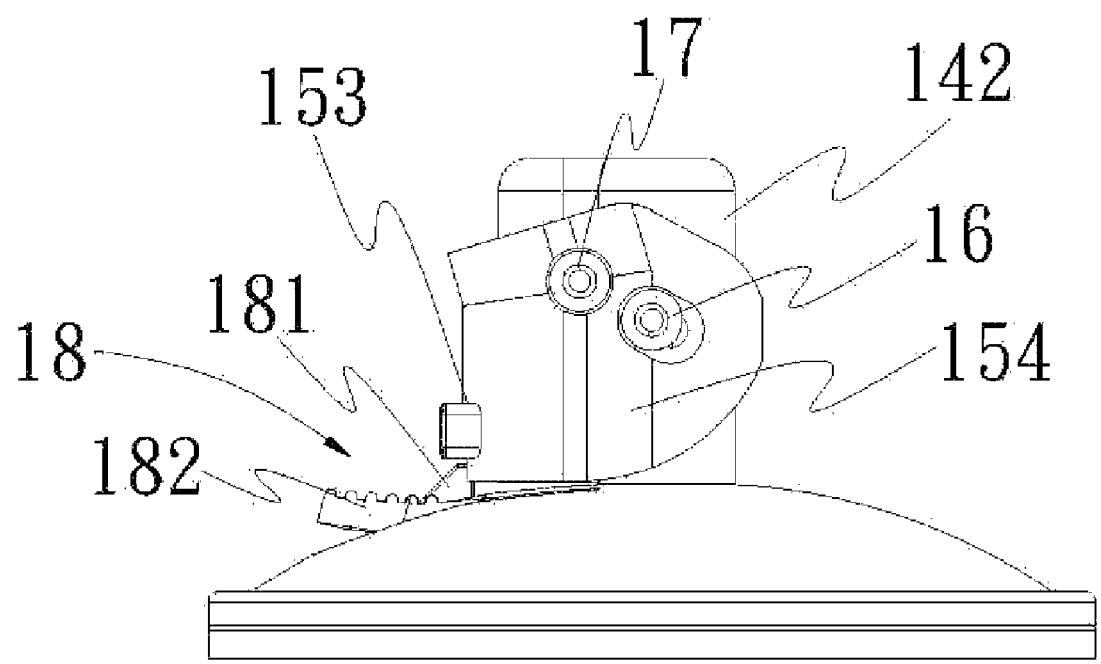
FIG. 7 is a side view of a button arm of a suction cup structure being pressed.

Referring to FIG. 7 for the side view of a button arm of a suction cup structure has been pressed. The activation piece 154 of the button arm 15 of the suction cup structure 10 uses the axial bolt 17 as the rotation axis pivot. Therefore, a shorter lever is formed from the slide bolt 16 to the rotation axis pivot, and a longer lever is formed from the button end 153 to the rotation axis pivot. When the button end 153 of the button arm 15 is inwardly pressed, the slide bolt 16 is at a highest portion of the slide notch 143. Moreover, the disk body 141 of the holder base 14 has a clasp 18 which has a protrusion 181. When the button end 153 is inwardly pressed, the button end 153 can be clasped to prevent the lifting rod 12 from being downwardly moved due to the release force generated by the spring 13. Further, after the downward force is put on the downward button 182 of the clasp 18, the protrusion 181 then backwardly rotates to come off the button end 153. The release force generated by the spring 13 then pushes the lifting rod 12 to move downward. The suction then disappears and the button end 153 is allowed to return to the position as shown in FIG. 3.

Figure 8:
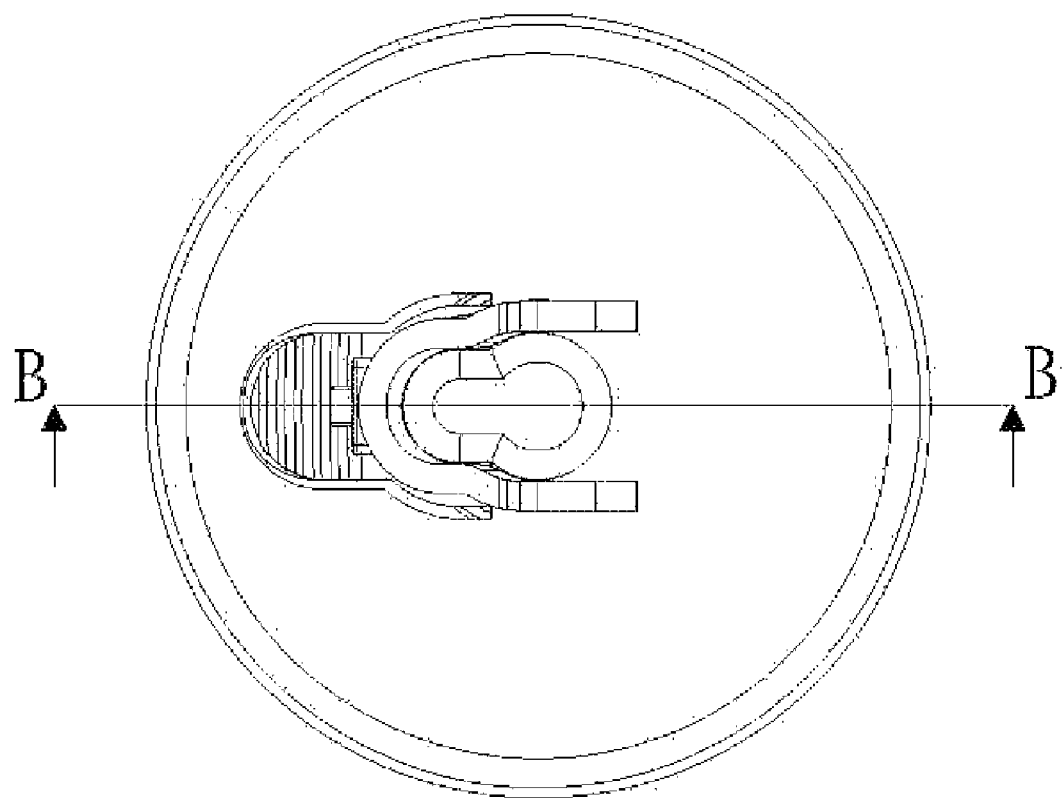
FIG. 8 is a top view of a button arm of a suction cup structure being pressed.

Referring to FIG. 8 and FIG. 9, FIG. 8 is a top view of a button arm of a suction cup structure being pressed, and FIG. 9 is a cross-sectional drawing of a button arm of a suction cup structure being pressed. A line segment BB shown in FIG. 8 is taken as the section shown in FIG. 9. The button arm 15 of the suction cup structure 10 can be clearly seen after the button arm 15 is pressed. The slide bolt 16 passing through the first countersink aperture 151 of the activation piece 154 is lifted to further lift the plate 122 of the lifting rod 12 mounted to the suction cup 11. Meanwhile, the spring 13 is prevented by the concave groove 51 of the sleeve 142, and the rod 121 provides a force for squeezing the spring 13 due to the rise of the axial bolt 17. The protrusion 181 of the clasp 18 then clasps the button end 153 to allow the slide bolt 16 to be stably maintained at the highest portion of the slide notch 143 of the sleeve 142. Meanwhile, the pressure of the space 52 between the adherence-area 53 and the suction cup 11 is smaller than the outside to generate the suction, thereby adhering to the adherence-area 53.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A suction cup structure comprising:
   a lifting rod, having a through hole;
   a holder base composed of a sleeve and a disk body vertically connected to the sleeve, the sleeve having a rotation axis hole horizontally penetrating through the sleeve and a slide notch;
   a button arm having a button end and a pair of activation pieces, the pair of activation pieces connected to two sides of the button end respectively, the pair of activation pieces having a first hole and a second hole horizontally penetrating through the button arm, the button arm vertically sheathed to the sleeve such that the first hole corresponds to the slide notch and the second hole corresponds to the rotation axis hole;
   an axial bolt passing through the second hole and the rotation axis hole to pivotally connect with the button arm and the holder base; and
   a slide bolt passing through the first hole, the slide notch and the through hole;
   wherein the button end is pressed, the button arm rotates, and the activation piece allows the slide bolt to move toward an upper portion from a lower portion of the first hole, and meanwhile the slide bolt in the slide notch moves toward the upper portion from the lower portion to drive the lifting rod.

2. The suction cup structure of claim 1, wherein the suction cup structure further has a suction cup, and the suction cup being a plate-shaped and slightly having resilience, the lifting rod vertically connected to a plate of the suction cup.

3. The suction cup structure of claim 2, wherein the lifting rod vertically assembled into the sleeve, the slide notch corresponding to the through hole, the rotation axis hole being not overlapped with the lifting rod, the suction cup disposed under the disk body, and a space formed between an upward protrusion of the disk body and the suction cup and for providing the suction cup to move therein.

4. The suction cup structure of claim 2, wherein the slide bolt is at the bottom of the slide notch before the button end is pressed, and the lifting rod does not lift the suction cup to generate the suction.

5. A suction cup structure comprising:
   a suction cup being a plate-shaped and slightly having resilience;
   a lifting rod vertically connected to a plate of the suction cup, and having a through hole horizontally penetrating through the lifting rod;
   a holder base composed of a sleeve and a disk body vertically connected to the sleeve, the sleeve having a rotation axis hole horizontally penetrating through the sleeve and a slide notch, the lifting rod vertically assembled into the sleeve, the slide notch corresponding to the through hole, the rotation axis hole being not overlapped with the lifting rod, the suction cup disposed under the disk body, and a space formed between an upward protrusion of the disk body and the suction cup and for providing the suction cup to move therein;
   a button arm having a button end and a pair of activation pieces, the pair of activation pieces connected to two sides of the button end respectively, the pair of activation pieces having a first hole and a second hole horizontally penetrating through the button arm, the button arm vertically sheathed to the sleeve such that the first hole corresponds to the slide notch and the second hole corresponds to the rotation axis hole;
   a axial bolt passing through the second hole and the rotation axis hole to pivotally connect with the button arm and the holder base; and
   a slide bolt passing through the first hole, the slide notch and the through hole to assemble the button arm, the holder base and the lifting rod;
   wherein before a button end is pressed, the slide bolt is at the bottom of the slide notch, and the lifting rod does not lift the suction cup to generate the suction; and when the button end is pressed, the button arm rotates, and the activation piece allows the slide bolt to move toward an upper portion from a lower portion of the first hole, and meanwhile the slide bolt in the slide notch moves toward the upper portion from the lower portion to drive the lifting rod such that the lifting rod lifts the suction cup to generate the suction.

6. The suction cup structure of claim 5, wherein the suction cup structure further has a spring that is sheathed to a rod of the lifting rod, and the rod and the spring are assembled to the sleeve, and when the lifting rod upwardly moves, the spring provides a release force.

7. The suction cup structure of claim 6, wherein the disk body has a clasp, and the clasp has a protrusion for clasping the button arm to prevent the lifting rod from moving toward the direction of the release force due to the release force.

8. The suction cup structure of claim 7, wherein the clasp has a downward button, and after the downward button receives a downward pressing force, the protrusion is unable to clasp the button arm, and the lifting rod is moved through the release force, and when the lifting rod is moved, the slide bolt is driven to slide in the slide notch to drive the radial arm, and the button end therefore returns to an original position.

9. The suction cup structure of claim 5, wherein the first hole and the second hole are countersink holes.

10. The suction cup structure of claim 5, wherein the slide notch is a rectangular notch.

11. The suction cup structure of claim 5, wherein the first hole has a longer axis and a shorter axis, and the longer axis is directed at the second hole, and the first hole and the second hole are at different vertical lines.

* * * * *